June 21, 1960

E. A. HOSKINSON 2,942,173

MAGNETIC PULSE INVERTER

Filed Dec. 23, 1955

*INVENTOR.*
EUGENE A. HOSKINSON

*BY* William R. Lane

ATTORNEY 2,942,173

MAGNETIC PULSE INVERTER

Eugene A. Hoskinson, Van Nuys, Calif., assignor to North American Aviation, Inc.

Filed Dec. 23, 1955, Ser. No. 554,950

2 Claims. (Cl. 321—43)

This invention pertains to pulse inverters and, more particularly, to pulse inverters incorporating saturable reactors in a bridge circuit.

Prior known circuits for pulse inverters made use of such equipment as electronic oscillators, frequency changes, diode rectifiers, etc. These devices are most suitable for applications where small amounts of voltage and power are required. However, there are applications where several hundred watts are needed and for which there is also a high voltage requirement. Present design of vacuum tubes, diode electrifiers and other electronic components presently used in pulse inverter circuits precludes their use for high power and high voltage applications.

It is well-known that the inductive reactance in an iron core inductance may be controlled to offer more or less reactance by controlling the flux level of the core by external means such as bias sources and signal sources. Core materials are usually selected from nickel-iron alloys which have relatively high permeability and low coercive forces. In addition, for better operating efficiency of circuits, core materials with rectangular hysteresis loop characteristics are selected.

The use of saturated magnetic devices is well-known. Devices incorporating saturable reactors have a high degree of dependability with resulting low maintenance. They are inherently quite efficient and combine well with other electronic circuits. The circuits employing saturable reactors are simple. No "firing" circuits or grid controls, common in electronic circuits using vacuum tubes, are needed. The only power needed, in addition to input alternating current, is a small amount of direct current bias for saturation.

In the device contemplated by this invention, a source of alternating pulses of several hundred watts and several thousand volts is converted to unidirectional pulses.

A particular advantage of this invention is its simplicity and minimum number of elements of superior reliability.

It is therefore an object of this invention to provide a magnetic pulse inverter of simple construction.

It is another object of this invention to provide an improved pulse inverter.

A further object of this invention is to provide a bridge-type magnetic pulse inverter.

A still further object of this invention is to provide a pulse inverter which can deliver a high amount of power at a high voltage.

A further object of this invention is to provide a pulse inverter utilizing saturable reactors.

Another object of this invention is to provide an improved frequency doubler circuit.

Figure 1:
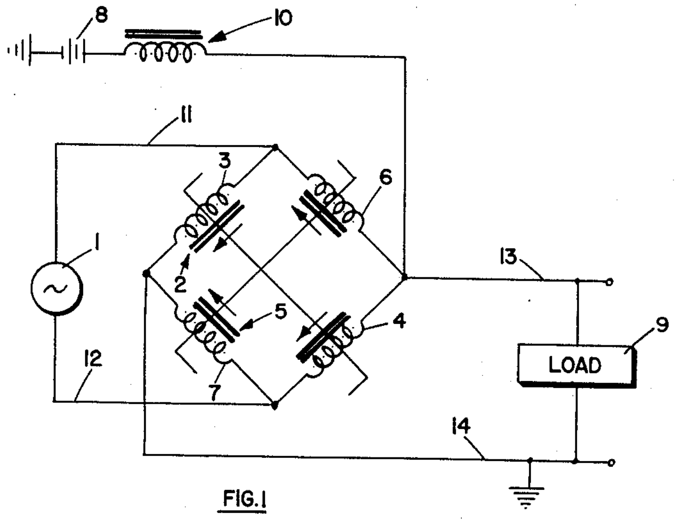
Figure 2:
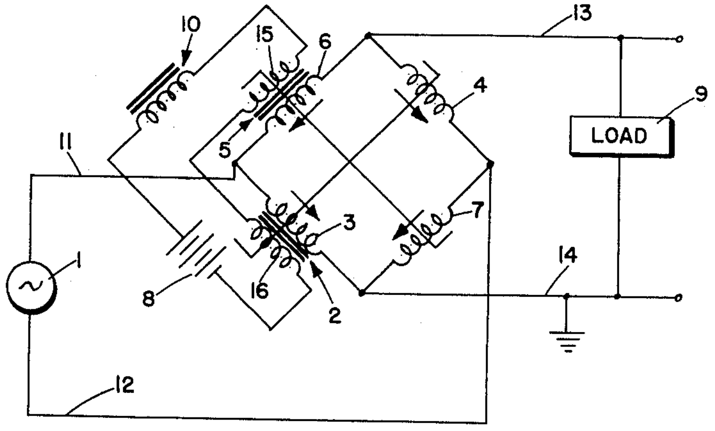
Figure 3:
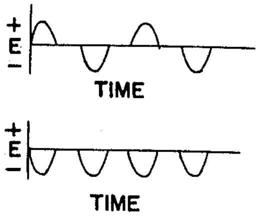

Other objects of invention will become apparent from the following description taken in connection with the accompanying drawings, in which Fig. 1 is a schematic diagram of this invention;

Fig. 2 is a modified embodiment of the device of Fig. 1;

And Fig. 3 is a graph of voltage vs. time for the input and output circuits of the pulse.

The device of this invention receives an alternating pulse voltage from signal source 1, Fig. 1. Pulses are fed to opposite corners of a bridge circuit comprising winding 3 and winding 4 of saturable reactor 2, and winding 6 and winding 7 of saturable reactor 5. A D.-C. bias source 8 is connected to the common connection of windings 4 and 6 and the common connection of windings 3 and 7 of saturable reactors 2 and 5, respectively. A unidirectional output signal is received at load 9.

The saturable reactor bridge circuit changes the polarity of the alternately positive and negative pulses from the input to output pulses of a single polarity at load 9. The pulse output has twice the repetition rate of the pulse input applied to the bridge circuit. The reactors are driven to saturation by the action of the D.-C. bias 8. Choke 10, in series with the D.-C. bias and the input to the bridge circuit, is large enough so that the D.-C. current is essentially free from any alternating components from the bridge circuit. D.-C. bias source 8 saturates the various reactors in the bridge circuit in such a way that the bridge circuit converts alternating pulses at the input to unidirectional pulses at the output.

In this manner, an alternating polarity pulse signal is converted to a unidirectional pulse signal having a frequency twice that of the input.

It is to be noted that windings 3 and 4 are wound upon a common core, as are windings 6 and 7. Any convenient system of bias and control windings may then be applied to these cores, provided the signal is sufficient to saturate both cores, it being understood that the cores are of a nickel-iron alloy material such as Orthonol or Deltamax.

In operation, D.-C. bias signal 8 is applied to saturable reactors 2 and 5, saturating the cores of the reactors in the direction shown by the arrows in Fig. 1. During the first half-cycle of operation, the voltage from signal source 1 is positive at line 11 with respect to line 12. Since reactor 2 is saturated in the same direction as current flow in line 11, there is little or no impedance presented to the flow of current through winding 3 of reactor 2, thus permitting source 1 to drive current through winding 3, load 9, and winding 4 of reactor 2. There can be no current path through winding 6 of reactor 5 because current flows in a direction opposite to the direction the D.-C. bias signal has saturated reactor 5. Instead, the current will momentarily desaturate reactor 5, which then presents a high impedance to the current. However, this current opposing the bias signal at winding 6 is not of sufficient magnitude to saturate reactor 5 in the opposite direction. Winding 7 of core 5 is also affected in this manner. Thus it can be seen that the positive input signal at line 11 with respect to line 12 is inverted by the saturable reactor bridge circuit so that it appears across the load as a positive signal at line 14 with respect to line 13.

After a time delay determined by circuit constants not of this invention, the second half-cycle commences. The time delay is of sufficient period to allow D.-C. bias 8 to resaturate all reactor cores in the direction shown.

On the next half-cycle when the voltage from signal source 1 is positive at line 12 with respect to line 11, the operation is similar to that described on the first half-cycle. Current in line 12 is allowed to flow through winding 7 of reactor 5, since reactor 5 is saturated in a direction so that winding 7 presents a negligible impedance to the flow of current from line 12. Current will not pass through winding 4 because reactor 2 is saturated in a direction opposing the flow of current, but will momentarily desaturate reactor 2. The current path followed is from line 12 through winding 7 of reactor 5, load 9, and winding 6 of reactor 5.

It is to be noted that windings 3 and 4 of reactor 2 effectively act as an open circuit during the flow of current in this second half-cycle. Reactor 2, originally saturated in the direction shown, is desaturated by the opposing current flow from signal source 1, and thereby presents a high impedance to the flow of current from either direction.

In this second half-cycle operation, the positive input signal at line 12 with respect to line 11 appears across load 9 as a positive signal at line 14 with respect to line 13. Thus it can be seen that the pulses across load 9 are, by the reason of the different paths followed in the bridge circuit, connected to pulses of single polarity across load 9.

In the circuit of Fig. 2, additional D.-C. control windings have been added to the saturable reactors. D.-C. bias signal 8 is applied to control winding 15 of reactor 2 and control winding 16 of reactor 5. The core of each reactor is saturated by this D.-C. bias in the direction indicated in Fig. 2 by the arrows near each winding. As soon as a positive pulse appears across the input terminals the potential at line 11 being positive with respect to the potential at line 12, reactor core 2 is driven farther into saturation and still presents little or no impedance. The positive pulse is expressed across load 9. The positive pulse is prevented from passing through windings 6 and 7 of reactor 5 because the pulse flows in a direction opposed to the bias signal 8. This momentarily desaturates reactor 5, whose windings then present a high impedance to the positive pulse.

When a positive pulse is applied, winding 3 of reactor 2, load 9, and winding 4 of reactor 2, form a unidirectional path. When a negative pulse is applied to the input, winding 7 of reactor 5, load 9, and winding 6 of reactor 5, form a unidirectional current path. Thus it can be seen that the bridge circuit acts as a series of switches which changes the polarity of the voltage applied to the load, thus transforming an input signal of alternating negative and positive pulses into a signal of all positive or all negative pulses.

Fig. 3 is a conventional voltage vs. time graph showing the alternate positive and negative pulses at the input converted to unidirectional pulses at the output. It is to be noted that the frequency of the ouput is twice that of the input.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A magnetic pulse inverter comprising, a bridge circuit, said bridge comprising a pair of saturable reactors, one coil of said first saturable reactor and one coil of said second saturable reactor forming a first parallel current branch of said circuit and a second coil of said first and second saturable reactors forming a second parallel current branch of said bridge circuit, a pulse generating source connected across said current branches, a pair of output terminals, one of said terminals connected to the junction of the coils of said first current branch and the other of said terminals connected to the junction of the coils of said second current branch, a D.-C. source connected across said output terminals whereby all the coils of said saturable reactors are saturated in the same direction between said output terminals, an inductor in series with said D.-C. source whereby the negative and positive pulses from said pulse generating source are inverted to obtain pulses of unidirection.

2. A magnetic pulse inverter comprising a pair of saturable reactors connected to form a bridge circuit, one coil of said first saturable reactor and one coil of said second saturable reactor forming a first branch of said bridge circuit, a second coil of said first saturable reactor and a second coil of said second saturable reactor forming a second branch of said bridge circuit in parallel with said first branch, means for saturating said saturable reactors, said means comprising a third coil of said first saturable reactor, a third coil of said second saturable reactor, an inductor, and a D.-C. source all connected in series, an A.-C. input signal directly connected at one end to the junction of said coils of said first branch and directly connected at the other end to the junction of said coils of said second branch, and a pair of output terminals directly connected across said parallel branches whereby the negative and positive pulses from said pulse generating source are inverted to obtain pulses of unidirection across said output terminals.

References Cited in the file of this patent

UNITED STATES PATENTS

| | | |
|---|---|---|
| 1,745,378 | Osnos | Feb. 4, 1930 |
| 2,418,640 | Huge | Apr. 8, 1947 |
| 2,418,641 | Huge | Apr. 8, 1947 |
| 2,723,373 | Steinitz | Nov. 8, 1955 |